United States Patent [19]

Stevens

[11] Patent Number: 5,156,071

[45] Date of Patent: Oct. 20, 1992

[54] CHAIN SAW SHARPENER WITH BUILT-UP GRINDING TOOL

[76] Inventor: Walter Stevens, 95 East St., Loganville, Wis. 53943-9782

[21] Appl. No.: 751,323

[22] Filed: Aug. 28, 1991

[51] Int. Cl.⁵ .............................................. B23D 63/16
[52] U.S. Cl. ........................................ 76/37; 76/80.5
[58] Field of Search ........................... 76/37, 40, 80.5; 51/204, 209 R

[56] References Cited

U.S. PATENT DOCUMENTS

| | | | |
|---|---|---|---|
| 2,268,663 | 1/1942 | Kuznick | 51/209 R |
| 2,508,042 | 5/1950 | Rehnberg | 51/209 R |
| 3,271,911 | 9/1966 | McKenna | 51/209 R |
| 4,966,055 | 10/1990 | Staggs | 51/209 R |

FOREIGN PATENT DOCUMENTS 3235132 3/1984 Fed. Rep. of Germany .......... 76/37

*Primary Examiner*—Roscoe V. Parker
*Attorney, Agent, or Firm*—Lathrop & Clark

[57] ABSTRACT

A sharpening tool has a flat central portion circular plate to which is affixed circumferential abrasive bead having convex profile and formed of an abrasive grit bonded by epoxy to the plate. The tool is less wide than the spacing between the depth gauge and the cutting tooth of a chain saw blade and is mounted to a motor which is pivotal on a frame to bring the sharpening tool into position between the depth gauge and the cutting tool. The sharpening tool may then be urged against the cutting tooth to cut a desired tooth profile.

15 Claims, 3 Drawing Sheets

CHAIN SAW SHARPENER WITH BUILT-UP GRINDING TOOL

FIELD OF THE INVENTION

This invention relates to chain saw sharpeners in general and motor driven chain saw sharpeners in particular.

BACKGROUND OF THE INVENTION

Chain saws are normally employed in logging operations for the harvesting of timber. Chain saws are employed to fell trees and to reduce them to logs of manageable size. Chain saws may be powered by self-contained gasoline engines and are employed in situations where the depth of cut is more than a few inches and a wide kerf is desirable or acceptable. Though usually employed in logging operation, chain saws are employed whenever large timbers must be cut or shaped, as in the construction of log and timber-frame houses. Certain specialized, low volume, portable lumber mills employ chain saws for the production of dimension timber from logs.

Unlike a conventional saw blade where the cutting teeth have a single cutting edge and are integral with the peripheral edge of the saw disc in a circular saw, or the linear edge of a steel band in a band saw, the cutting teeth on a chain saw are fashioned from portions of links in a chain. Because the chain must cut a wide kerf to allow passage of the chain and the supporting chain saw bar, the teeth on chain saws normally have two cutting surfaces; one perpendicular to the saw kerf, and the other parallel to the saw kerf. The two cutting surfaces normally join at right angles in a chisel-bit-type cutter tooth or a single curved surface may be used which extends into the two planes perpendicular and parallel to the saw kerf.

The specialized shape of the cutting teeth on a chain saw and their location on links in a chain makes them unsuitable for sharpening on a conventional saw sharpening tool. Chain saws often require frequent sharpening. Chain saws generally do not incorporate tungsten carbide inserts which have lessened the requirement of sharpening conventional circular saws. Chain saws are often used in situations where the blade may come in contact with dirt or materials having embedded grit contained therein. It is not unusual that a chain saw employed in a logging operation may require daily sharpening in order to maintain the efficiency of the log harvesting process.

Chain saws may be sharpened with a round or triangular file which is drawn along the cutting surfaces of each tooth. This can be a tedious and time-consuming process, and numerous saw sharpeners have been developed to reduce the labor and improve the accuracy with which chain saws chains are sharpened.

One known type of chain saw sharpener employs a rotating cylindrical stone sized so that the cylindrical surface may form the cutting edges on the chain saw tooth. However, because of the small diameter of these cylindrical teeth sharpeners, they are prone to rapid wear which can result in uneven shaping of the cutting surfaces.

Other known chain saw chain sharpening machines employ grinding wheels which are shaped to form the proper cutting surfaces on the chain saw chain teeth. However, the abrasive wheels are formed of a brittle material and a substantial wheel section must be coextensive with the shaping surface of the wheel in order to support the shaping surfaces in contact with the chain saw teeth.

The cutting surfaces of a chain saw tooth are proceeded on the tooth by a depth gauge, which controls the depth of cut. This depth gauge limits the accessibility of the cutting edges and, therefore, imposes limitations on the ability of a grinding disc to access the cutting surfaces of the tooth to form an optimal cutting surface thereon.

What is needed is a chain saw sharpening tool employing the advantages of a grinding wheel, but able to gain better access to the cutting surfaces through the gap formed between the depth gauge and the cutting surfaces.

SUMMARY OF THE INVENTION

The chain saw sharpener of this invention employs a bead of abrasive material formed from epoxy and emery grit, or the like, and fixedly attached along one side of the outer peripheral edge of a thin metal disc, the metal disc defining an axis about which it is rotated. The peripheral edge of the disc has protrusions from the surface of the disc, and the abrasive bead is bonded to one surface of the metal disc such that the protrusions protrude into and are embedded in the abrasive bead. The protrusions increase the sheer strength of the bond between the abrasive bead and the metal disc.

The sharpening tool is supported between two support discs and is attached to the shaft of a motor for rotation about its axis. The motor is hingedly mounted to a frame to allow the sharpening tool to be rotated into position for sharpening. The chain saw sharpener further employs a chain holder which clamps a chain saw chain to a semi-circular shaped holder. The holder is pivotal about the center of a circle defining the holder. The circular holder may be rotated about the pivotal axis and further employs a clamp for clamping the holder and the chain in suitable angular positions. The circular blade holder is mounted on a fixture. The fixture provides for urging the circular holder and the cutting surfaces of the teeth on the chain against the abrasive bead on the chain saw sharpening tool. The fixture also provides for rotating the circular holder about an axis perpendicular to its pivot axis such that the chain may be rotated for presenting left and right facing cutting teeth to be sharpened by the sharpening tool.

It is an object of the present invention to provide a chain saw sharpener which can fit between the depth gauge and the cutting tooth for improving the profile thereon.

It is another object of the present invention to provide a chain saw sharpener which can cut a wider variety of tooth profiles on the teeth of a chain saw.

It is a further object of the present invention to provide a chain saw sharpener wherein the chain need not be repositioned and re-clamped between the sharpening of individual teeth.

It is a further object of the present invention to provide a grinding tool for use in sharpening chain saw blades employing a disc of ductile material.

Further objects, features, and advantages of the invention will be apparent from the following detailed description when taken in conjunction with the accompanying drawings.

DESCRIPTION OF THE PREFERRED EMBODIMENT

Figure 1:
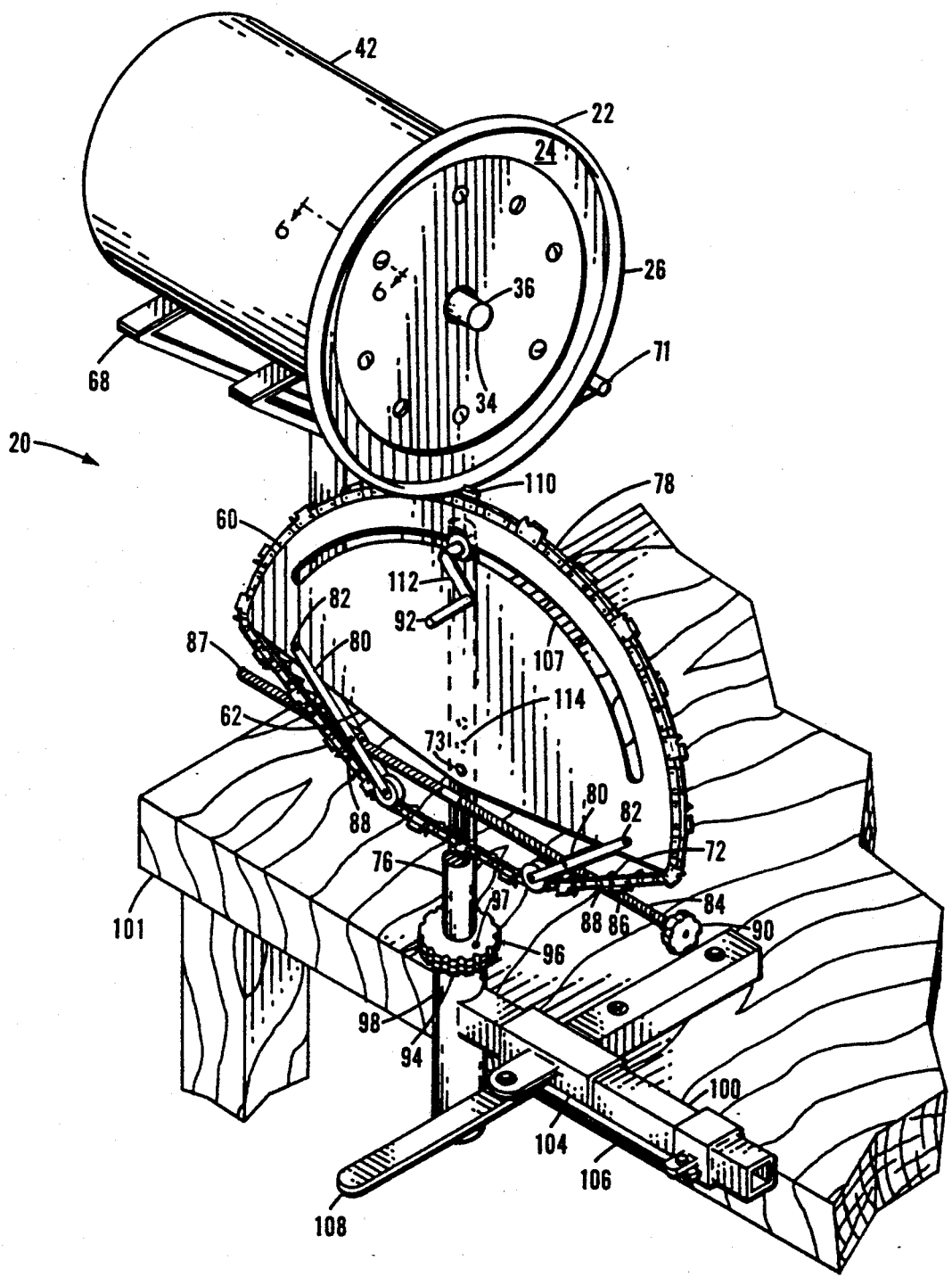
FIG. 1 is an isometric view of the chain saw sharpener of this invention.

Referring more particularly to FIGS. 1-8, wherein like numbers refer to similar parts, a chain saw sharpener 20 is shown in FIG. 1. The chain saw sharpener 20 employs a sharpening tool 22, best shown in FIG. 4 and 6. The sharpening tool 22 is constructed of a flat metal disc 24, which has an abrasive bead 26 bonded along one side 28 of the peripheral edge 30 of the sharpening tool 22.

Figure 2:
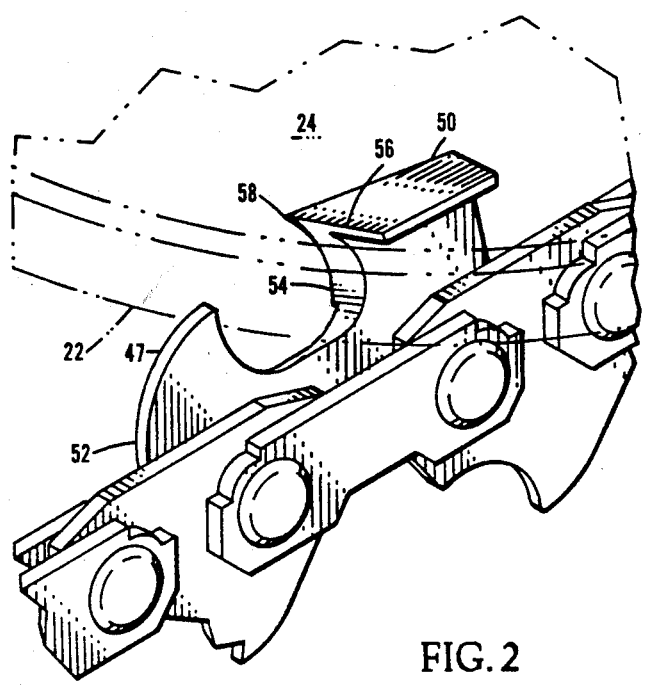
FIG. 2 is an isometric view of a chain saw tooth with the chain saw sharpening tool of this invention shown in phantom view in cutting position.
Figure 3:
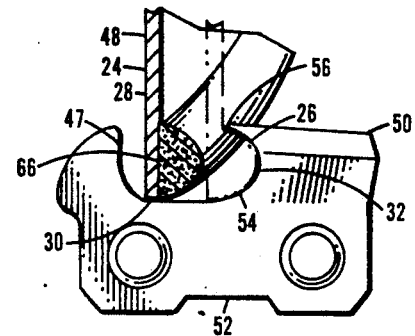
FIG. 3 is a side elevational view of a chain saw tooth with the chain saw sharpening tool of this invention shown in sectional view and in phantom view in a sharpening position.
Figure 4:
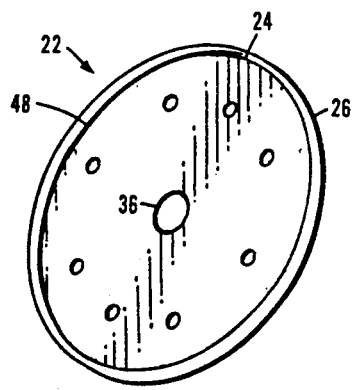
FIG. 4 is an isometric view of the chain saw sharpening tool of the sharpener of FIG. 1.
Figure 6:
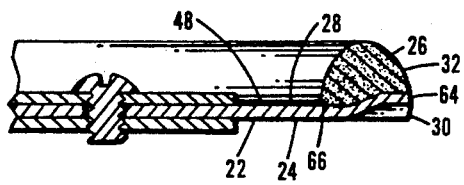
FIG. 6 is a cross-sectional view of the chain saw sharpening tool of FIG. 1 taken along section line 6—6.
Figure 7:
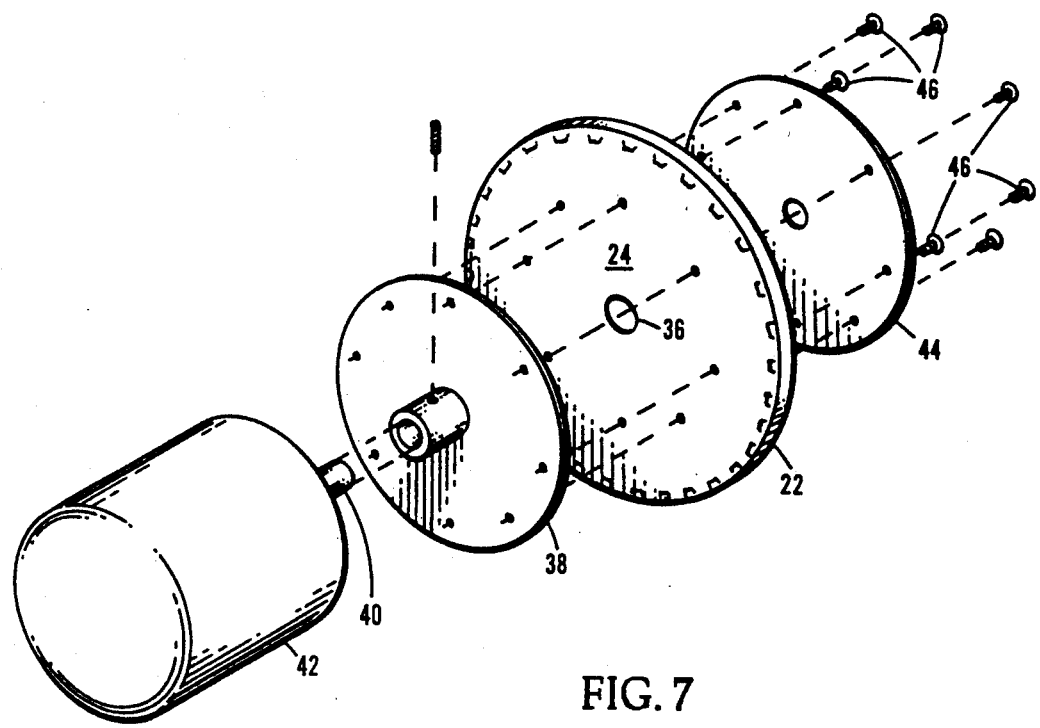
FIG. 7 is an exploded isometric view of the chain saw sharpening tool of FIG. 1 and its mounting to a drive motor.

The exterior profile 32 of the abrasive bead 26, best shown in FIGS. 3, and 6, is constant along the peripheral edge 30 of the tool disc 24. The sharpening tool 22 has a central axis 34 concentric with a central mounting hole 36. As shown in FIG. 7, the sharpening tool 22 is clamped between a face plate 38, which is mounted on the drive shaft 40 of the motor 42, and a retaining plate 44, by means of screws 46. The face plate 38 and the retaining plate 44 provide support to the tool disc 24. but have limited radial extent so that a portion 48 of the disc 24 adjacent to the abrasive bead 26 is left unsupported. The arrangement of the sharpening tool 22, the face plate 38, and the retaining plate 44 results in the rigid support of the abrasive bead 26 by a narrow extending portion 48 of the disc 24. The narrow portion 48 of the disc 24 allows the sharpening tool 22 to be positioned between the depth gauge 47 and the cutter tooth 50 on the cutting link 52 of a conventional chain saw blade 60 as shown in FIGS. 2 and 3.

The cutting tooth 50 has a vertical cutting surface 54 and a horizontal cutting surface 56. The vertical and horizontal cutting surfaces 54, 56 are joined at a common edge 58. As shown in FIG. 2, the two cutting surfaces form a chisel-bit-type cutter tooth in which the cutting surfaces meet at a common edge 58. Alternatively, the cutting surfaces may form a rounded tooth cutter (not shown) in which the vertical cutting surface 60 gradually blends into the horizontal cutting surface along a smooth circular radius.

Because the sharpening tool 22 has a thin metal disc 24 with a thin, unsupported portion 48 which can fit between the depth gauge 47 and the cutter tooth 50, the sharpening tool 22 can be mounted in a plane which is perpendicular to a reference plane, the reference plane also being perpendicular to the plane defined by the path of the chain saw chain 60. As best shown in FIG. 1, the chain saw blade holder 62 and the sharpening tool 22 both lie in vertical planes which intersect at a vertical line.

Known chain saw sharpeners require the sharpening tool to approach the cutter tooth 50 from the side in order to avoid the depth gauge 47, because the grinding wheels employed are brittle and require a constant or increasing wheel section to support the portion of the wheel sharpening the cutting edges 54, 56 of the tooth 50.

Figure 5:
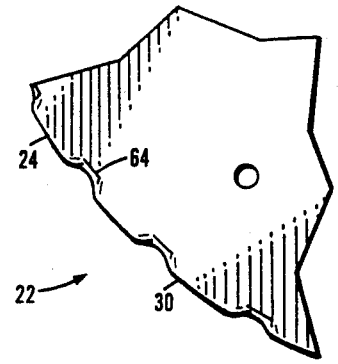
FIG. 5 is an enlarged fragmentary rear elevational view of the chain saw sharpening tool of FIG. 4.

The sharpening tool 22 has a multiplicity of protrusions 64 spaced along its peripheral edge 30, best shown in FIGS. 5 and 6. The protrusions 64 extend into the abrasive bead 26 out of the plane of the tool disc 24. The abrasive bead 26 experiences a shear force between the abrasive bead 26 and the tool disc 24 as it is rotated against the cutter tooth 50 in cutting engagement. The protrusions 64 serve the purpose of mechanically strengthening the bond 66 between the abrasive bead 26 and the tool disc 24, so resisting shear loads.

The abrasive bead may be advantageously made by mixing a medium grit emery abrasive with a two-part epoxy, such as that obtainable from CIBA GEIGY Corporation Plastics and Additive Division, 3 Skyline Drive, Hawthorne, N. Y. 10532. The two-part epoxy employs hardener HV953. Sufficient grit should be added to the two-part epoxy to make it gritty, but not too thick. The epoxy/grit mixture is preferably formed in a ring-shaped mold to which the tool disc 24 is clamped. When the two-part epoxy has fully cured, the tool disc 24 is removed from the mold, with the abrasive bead 26 securely bonded to the peripheral edge 30.

The abrasive bead 26 has a smooth convex shape having a cross section of a conic section as shown in FIGS. 3 and 6. The bead cross section has an axis of symmetry parallel to the disc axis of symmetry and the bead extends convexly outward from the disc.

Figure 8:
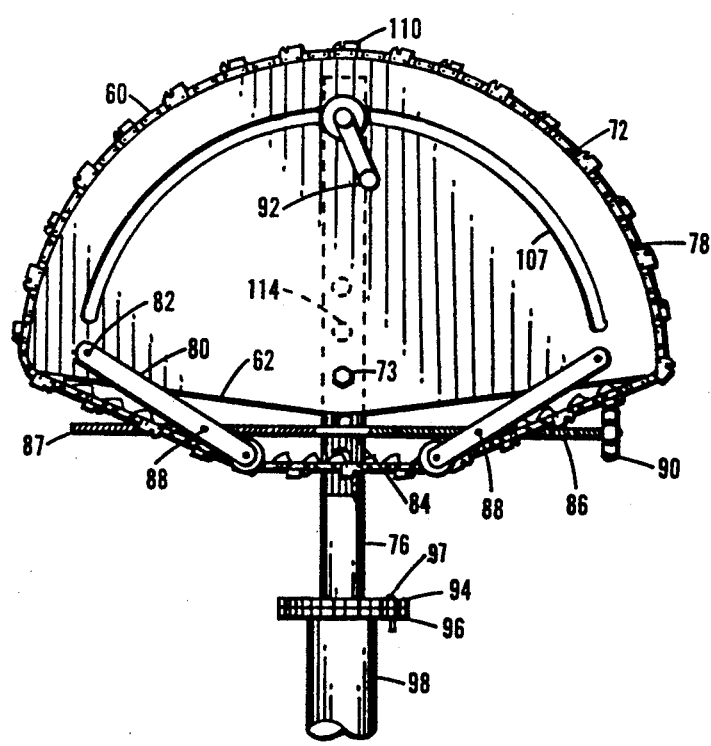
FIG. 8 is a front elevational view of the chain holder of circular profile employed in the chain saw sharpener of FIG. 1.

As shown in FIG. 8, the sharpening tool 22 may be advantageously employed with a simplified chain saw sharpener 20 employing a semi-circular blade holder 62. The sharpening tool 22, which is mounted on the motor 42 between the face plate 38 and the retaining plate 44, is mounted in a vertical plane on the support 68. The sharpening tool 22 when sharpening a tooth rotates about an axis which is fixed relative to the frame or support 68. The motor 42 is connected by hinges 71 to the frame 68 in such a way to allow the sharpening tool to be brought down into position for sharpening the cutting surfaces, 54, 16 between the depth gauge and the cutter tooth 50. The chain saw chain 60 which is being sharpened is mounted on the blade holder 62. The blade holder 62 is, like the sharpening tool 22, mounted in a vertical plane. The blade holder 62 has a semi-circular support disc 72 which has a central hole 73 for pivotally mounting the support disc 72 on the vertical support member 76. The chain 60 is clamped to the peripheral edge 78 by means of two pivotal tensioning arms 80. The pivoting arms 80 have pivotal attachments 82 to the semi-circular support disc 72.

The tensioning arms 80 are biased outwardly and downwardly against the chain 60 by a threaded tensioning bar 84. The right-hand end 86 of the bar 84 is threaded with right-handed threads and the left-handed end 87 of the bar 84 is threaded with left-handed threads. The tensioning bar 84 is threadedly engaged with pivot nuts 88, which are pivotally mounted to the tensioning arms 80. Rotation of the tensioning knob 90 causes the tensioning bar 84 to rotate so advancing or retracting the pivot nuts 88 along the length of the tensioning bar 84. Movement of the pivot nuts causes the tensioning arms 80 to pivot about their pivotal attachments 82 into or out of tensioning engagement with the chain 60.

An axial positioning clamp 92 clamps the semi-circular support disc 72 to the vertical support member 76 holding a cutting tooth 50 mounted along the peripheral edge 78 in proper position for sharpening by the sharpening tool 22.

The vertical support member 76 is pivotal about a vertical axis by means of a pivot plate 94. The pivot plate 94 has positioning teeth 96 for repeatably positioning the blade holder 62 with respect to the cutting tool 22. When the pivot plate 94 is in position, a pin 97 may be inserted therethrough to secure the vertical support member 76. The pivot plate 94 rests on a vertical extension 98 of a horizontal member 100 which is slidably mounted to a base 101 to which the frame 68 is also mounted. The horizontal member is movable within a sleeve 104 by means of a link 106 and lever 108 arrangement. Movement of the lever urges the horizontal member 100 forward, so forcing the attached cutter tooth 50 against the abrasive bead 26 of the sharpening tool 22.

To employ the chain saw sharpener 20 in the sharpening of a chain saw blade 60, the tensioning arms 80 are retracted by rotating the tensioning bar 84 by means of the tensioning knob 90 and placing the chain 60 in the peripheral slot (not shown) in the peripheral edge 78 of the semi-circular support disc 72. The chain 60 is clamped to the peripheral edge by adjusting the tensioning knob 90 until the tensioning arms 90 are firmly engaged with the chain 60. The blade holder 62 is pivoted on the pivot plate 94 on the vertical axis to a position marked by the positioning teeth 96 which is suitable for cutting the left or right profiled saw teeth 50. The circular support disc 72 is then rotated about its central hole 73 to bring a tooth 50 to the uppermost position 110 adjacent to the sharpening tool 22 and the support disc 72 is clamped in place against the vertical support 76 by means of clamping handle 112 which passes through the guide slot 107.

The motor 42 and sharpening tool, which are rotated back about the hinges 71 when the chain saw blade is being moved, is then pivoted to bring the sharpening tool bead 26 within the depth gauge and the cutter tooth 50 as shown in section view in FIG. 3. The cutting surfaces 54, 56 of the tooth 50 are then urged against the abrasive bead 26 by means of the lever 108 which moves the horizontal member 100 and the attached vertical member 76 and blade holder 62 towards the sharpening tool 22 as shown in phantom view in FIG. 3 to sharpen the tooth 50 to a desired profile. After each tooth is sharpened, the circular support disc 72 is unclamped by means of the clamping handle 112 and the circular support disc 72 is pivoted on the vertical support member 76 to bring the next tooth 50 into proper position for sharpening. Left and right teeth on the chain 60, may be sharpened by first positioning the blade holder 62 at the proper angle for the right-facing teeth by means of positioning teeth 96, after which the blade holder 62 may be pivoted to the proper position for cutting the left-facing teeth.

Because of the advantageous way which the sharpening tool 22 can support the abrasive bead between the depth gauge 47 and the cutter tooth 50, a simplified chain saw sharpener 20 may be constructed. The chain saw sharpener 20 has a fixedly mounted motor 42 and sharpening tool 22. The chain saw sharpener 20 advantageously employs a chain saw blade holder 62, wherein the chain 60 need only be positioned and clamped twice during the sharpening of the cutter links 52 along the circumference of the chain 60.

Because the abrasive bead 26 is not part of a co-extensive ceramic wheel, the bead 26 may be shaped for optimal profiling of the cutter teeth 50 without regard for the limitations imposed by an abrasive profile on a grinding wheel. Namely, that the abrasive bead be co-extensive with an increasing sectional width of the abrasive wheel, which requires the grinding wheel to be angled so as to avoid the depth gauge 47 on the cutter links 52.

Because the length of a chain saw blade will vary depending on the size of the saw on which it is employed, the chain saw sharpener 20 will advantageously be capable of mounting blade holders 62 of varying radiuses on mounting holes 114 along the vertical member 76 so that the circular support discs of various size may have peripheral edges positioned to be tangent with the abrasive bead 26.

It should also be understood that whereas medium grit emery is described as the abrasive material, any suitable abrasive grit may be used. The preferred diameter for the sharpening tool 22 will be 10 inches and it will preferably be mounted on a motor with a rotation speed of 1725 RPM. However, tools of different diameter and rotation rates could be used.

It is understood that the invention is not confined to the particular construction and arrangement of parts herein illustrated and described, but embraces such modified forms thereof as come within the scope of the following claims.

I claim:

1. A grinding tool for sharpening chain saws comprising:
   a) a thin disc of metal symmetric about an axis and having an outer peripheral edge and two surfaces; and
   b) a bead of abrasive material comprised of a 400 emery abrasive grit embedded in a two-part epoxy adhesive which is fixedly mounted on one surface of the disc and adhesively bonded by the epoxy to one side of the disc adjacent to the outer peripheral edge, the bead being symmetrically spaced from the axis and adapted to engage the cutting surface of a tooth of a chain saw when the disc is rotated about the axis, so sharpening the tooth.

2. A grinding tool for shapening chain saws comprising:
   a) a thin disc of metal symmetric abut an axis and having an outer peripheral edge and two surfaces;
   b) a bead of abrasive material fixedly mounted on one surface of the disc adjacent to the outer peripheral edge, the bead being symmetrically spaced from the axis and adapted to engage the cutting surface of a tooth of a chain saw when the disc is rotated about the axis, so sharpening the tooth; and a first support disc, the disc being positioned parallel and adjacent to the thin metal disc and extending in a radial direction to within one quarter inch of the abrasive bead, the supporting disc being in fixed and supporting relationship to the thin disc so limiting deflection and warping of the thin metal disc as it is forced against the cutting edge of a tooth of a chain saw.

3. The apparatus of claim 2 wherein the tool further comprises a second supporting disc lying adjacent to the opposite side of the thin disc and being coaxial with the first support disc and the thin disc, and lying in supporting relation to the thin disc.

4. A grinding tool for sharpening chain saws comprising:
   a) a thin disc of metal symmetric about an axis and having an outer peripheral edge and two surfaces;
   b) a bead of abrasive material fixedly mounted on one surface of the disc adjacent to the outer peripheral edge, the bead being symmetrically spaced from the axis and adapted to engage the cutting surface of a tooth of a chain saw when the disc is rotated about the axis, so sharpening the tooth, and wherein the abrasive bead has a smooth, convex shape protruding outwardly from the surface of the disc to form a profile for optimum sharpening of a chain saw tooth.

5. A grinding tool for shapening chain saws comprising:
   a) a thin disc of metal symmetric about an axis and having an outer peripheral edge and two surfaces; and
   b) a bead of abrasive material fixedly mounted on one surface of the disc adjacent to the outer peripheral edge, the bead being symmetrically spaced from the axis and adapted to engage the cutting surface of a tooth of a chain saw when the disc is rotated about the axis, so sharpening the tooth, wherein the abrasive bead is in the shape of a portion of a conic section, the bead cross section having an axis of symmetry parallel to the disc axis of symmetry and the bead extends convexly outwardly from the disc.

6. An apparatus for shapening chain saws comprising:
   a) a frame;
   b) a chain saw chain holder, the holder adjustably mounted on the frame having a chain tensioner for biasing the chain to a taut position about the chain holder, and a tooth clamp for rigidly fixing sequential teeth of a chain saw to the chain holder;
   c) a drive motor pivotally mounted by a hinge to the frame and having a central drive shaft defining an axis and rotatably with respect to the motor;
   d) a sharpening tool having a thin metal disc symmetric about an axis and a bad of abrasive material fixedly mounted on one side of the disc adjacent to the outer peripheral edge, the bead being symmetrically spaced from the symmetric axis of the disc, wherein the disc is fixedly mounted to the drive shaft with its axis co-extensive with the axis of the drive shaft, the disc lying in a plane perpendicular to the drive shaft and having an outer peripheral edge and two surfaces; and
   e) a biasing mechanism mounted between the chain fixture and the frame, such that when the shapening tool is pivoted about the hinge into engagement with the tooth the mechanism is adapted to bias a tooth which is clamped in the tooth clamp against the rotating shapening tool such that the bad of abrasive material sharpens the chain saw tooth.

7. An apparatus for shapening a chain saw blade link having an upwardly protruding depth gauge spaced forwardly of an upwardly protruding curved cutting surface, comprising:
   a) a frame;
   b) a drive motor mounted to the frame and having a rotatably drive shaft; and
   c) a sharpening tool connected to the drive motor shaft and adapted to be rotated in a substantially vertical plane thereby, the shapening tool having a substantially flat narrow central portion with a peripheral edge, and an abrasive bead fixed to the central portion along the peripheral edge and protruding from the central portion in the direction of the drive shaft, wherein the width of the shapening tool is less than the spacing between the saw link depth gauge and the saw link cutting surface and wherein the bead has a convex profile adapted to sharpen the curved cutting surface.

8. The apparatus of claim 7 wherein the cutting tool central portion is a thin metal disc.

9. The apparatus of claim 8 wherein the metal disc has portions spaced along its peripheral edge defining a multiplicity of outwardly extending protrusions, the protrusions extending into the bead of abrasive material, so improving the shear strength of the fixed attachment between the bead of abrasive material and the disc.

10. The apparatus of claim 7 wherein the abrasive bead is comprised of an abrasive grit embedded in a two-part epoxy adhesive which is adhesively bonded by the epoxy to one side of the disc.

11. The apparatus of claim 10 wherein the abrasive grit is 400 emery abrasive.

12. The tool of claim 7 further comprising a first support disc, the disc being positioned parallel and adjacent to the thin metal disc and extending in a radial direction to within one quarter inch of the abrasive bead, the supporting disc being in fixed and supporting relationship to the thin disc so limiting deflection and warping of the thin metal disc as it is forced against the cutting edge of a tooth of a chain saw.

13. The apparatus of claim 12 wherein the tool further comprises a second supporting disc lying adjacent to the opposite side of the thin disc and being coaxial with the first support disc and the thin disc, and lying in supporting relation to the thin disc.

14. The tool of claim 7 wherein the abrasive bead has a smooth, convex shape protruding outwardly from the surface of the disc to form a profile for optimum shapening of a chain saw tooth.

15. The tool of claim 7 wherein the abrasive bead is in the shape of a portion of a conic section, the bead cross section having an axis of symmetry parallel to the disc axis of symmetry and the bead extends convexly outwardly from the disc.

* * * * *